L. E. SLAUSON.
TRACTION SHOE.
APPLICATION FILED JULY 3, 1919.
1,393,709.
Patented Oct. 11, 1921.
2 SHEETS—SHEET 2.
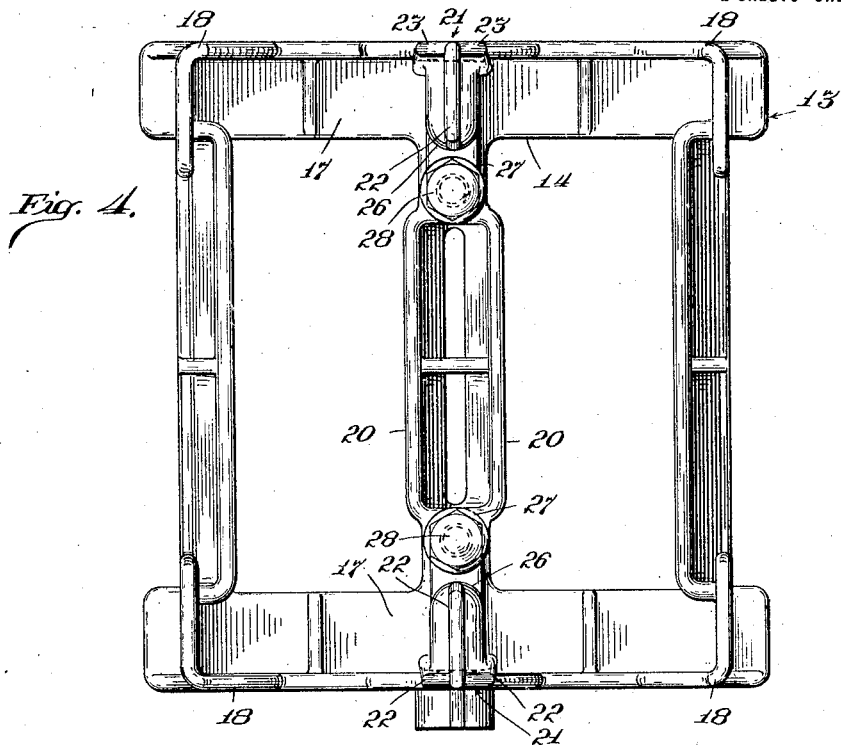
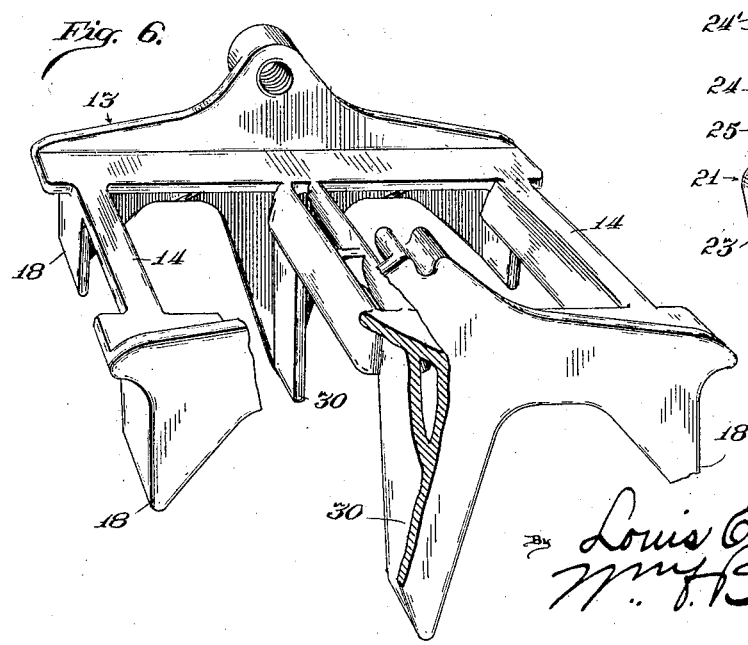
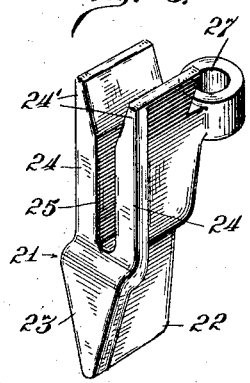
Inventor
Louis E. Slauson
Attorney

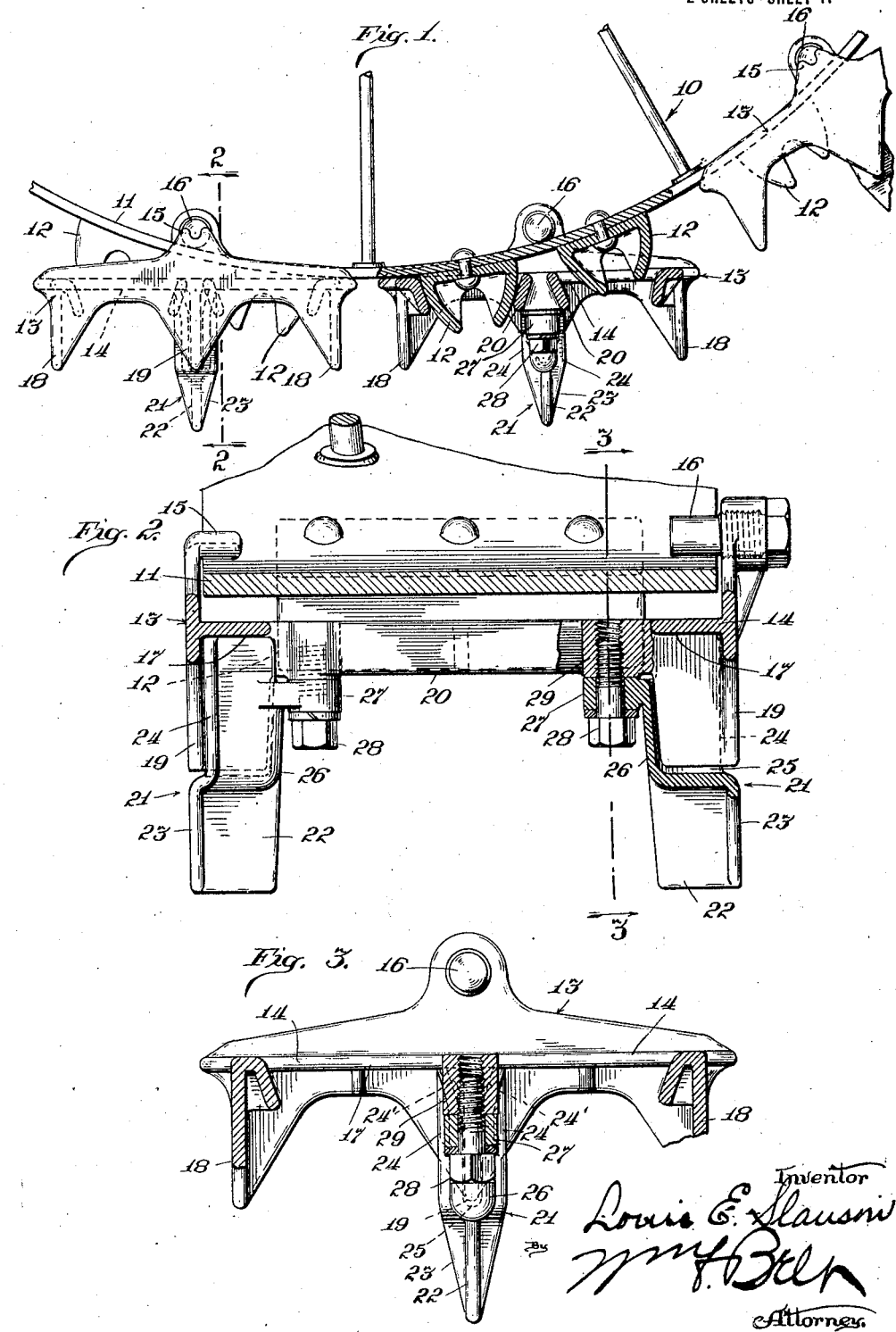

UNITED STATES PATENT OFFICE.

LOUIS E. SLAUSON, OF ROCK ISLAND, ILLINOIS, ASSIGNOR TO GRID-IRON-GRIP COMPANY, OF ROCK ISLAND, ILLINOIS.

TRACTION-SHOE.

1,393,709.  Specification of Letters Patent.  Patented Oct. 11, 1921.

Application filed July 3, 1919. Serial No. 308,439.

*To all whom it may concern:*

Be it known that I, LOUIS E. SLAUSON, a citizen of the United States, residing at Rock Island, in the county of Rock Island and State of Illinois, have invented certain new and useful Improvements in Traction-Shoes, of which the following is a specification.

In my Application Serial No. 302,680, filed June 9, 1919, I have described an invention, the primary object of which is to convert an ordinary smooth rim wheel into a traction wheel by the application thereon in a novel manner of a plurality of traction shoes so constructed and so mounted on the rim of the wheel that as the wheel revolves they will automatically adjust themselves in proper position for forward or reverse travel to lay a smooth and practically unbroken track over which the rim of the wheel travels smoothly and evenly and without slippage. And in that application I have shown other forms of traction shoes with which the invention may be embodied. I have found by practical experience that in some sections of the country the top soil is so loose or finely divided or sandy that, unlike the usual run of top soil, it will not afford sufficient resistance to obtain the desired tracton for the wheel. In other words the traction shoe which will be entirely satisfactory on ordinary top soils may slip more or less on loose or sandy top soil and thus lessen the efficiency of the traction wheel.

It is the object of my present invention to provide a traction shoe which is especially adapted for loose and sandy top soils and which will prevent slippage of the shoe and wheel when traveling on such soils.

A further object of the invention is to provide a traction shoe with substantial teeth for entering and engaging the soil to a depth sufficient to prevent the shoe and wheel from slipping, and which teeth may be readily detached when not required so that the wheel may travel smoothly and evenly over ordinary soils and paved roadways.

In the accompanying drawings,

Figure 1 is a sectional view showing a portion of a wheel rim with several shoes thereon embodying my invention in the form of detachable teeth.

Fig. 2 is a transverse sectional view on the line 2—2 of Fig. 1.

Fig. 3 is a sectional view on the line 3—3 of Fig. 2.

Fig. 4 is a top plan view of the shoe.

Fig. 5 is a detailed perspective view of a detachable tooth.

Fig. 6 is a perspective view partly broken away and in section showing a shoe equipped with integral deep teeth.

Referring to the drawings 10 designates the spokes of a wheel having a metal rim 11 upon the face of which teeth 12 are secured at spaced intervals. These teeth are shorter than the width of the rim and are located centrally between the side edges of the rim. A plurality of traction shoes 13 are loosely mounted in any suitable manner to swing by gravity on the rim of the wheel and they are provided with openings 14 to receive the teeth 12. The shoe may be provided at one side edge with a hook or lip 15 and at the other side edge with a removable bolt 16 for securing the shoe on the rim or other means for this purpose may be employed as, for example, those described in my co-pending application aforesaid.

The shoe selected for illustrating my invention comprises a one piece steel casting made in grid or skeleton form and provided with inwardly directed track flanges 17, end ground engaging cross-bars 18 and a middle ground engaging cross-bar 19, these cross-bars being recessed centrally, as shown in Fig. 2 so that each cross-bar comprises, in effect, a pair of spaced teeth with an integral connection or, to put it in a different way, a connecting member with downwardly or outwardly projecting teeth at its ends. Since the recesses in the cross-bar may be omitted and the teeth portions thereof connected to form a continuous ground engaging edge on the cross-bar extending from end to end thereof, and since instead of a continuous ground engaging edge the edge may be recessed at intervals instead of being provided with a single large recess 20, I prefer to use the general expression "cross-bar" as indicating generally the ground engaging parts of the shoe which connect the sides and the track flanges thereof. This will also indicate that my present invention is not limited or restricted to the particular type of shoe herein illustrated. I wish it to be understood clearly that the invention is intended for use in shoes of other constructions, some of which are illustrated in my co-pending application.

To adapt the shoe for loose and sandy soil I provide detachable teeth which may be readily secured on the middle cross-bar of the shoe to provide the shoe, in effect, with a middle ground engaging cross-bar of greater depth than the end cross-bars. For the form of shoe illustrated in Figs. 1 to 4 I provide two of the extension teeth designated generally 21 and shown in detail in Fig. 5. The extension tooth comprises a plane straight lower ground engaging part 22 and a socketed upper part, there being a tapered web 23 extending downward from the upper part at the outer end of the lower part to reinforce and strengthen said lower part. The socketed upper part comprises two side members 24 spaced apart to form the socket 25. These side members are connected at their inner edges by an end wall 26 (Fig. 2), and are beveled at 24' to provide a flaring entrance to the socket. A stud 27 projecting outwardly from the end wall 26 is bored and threaded to receive the bolt 28 by which the extension tooth is secured to the shoe, the said bolt engaging a threaded opening 29 in the bar 19 of the shoe.

I have found this to be a tooth of simple and inexpensive construction which can be conveniently and easily applied to and removed from a shoe of this type, but I desire to have it understood that I do not limit or restrict the invention to its adaptation for this particular type of shoe, although I now believe it is a preferred type, but I reserve the right to modify and change the form and construction to adapt it to other shoes and cross-bars within the scope of the appended claims.

I prefer to use detachable teeth so that they may be readily removed when it is desired to run the tractor over hard or compact soils or roads which do not require deep teeth. Except in cases where the tractor will be used only on loose or sandy soil it is important to have all the ground engaging projections of the same depth to provide smooth and even tracks for the wheels. On hard or compact soils and roads the deep teeth would not penetrate sufficiently with the result that the shoes would tilt on the ground and impart a bumpy and irregular movement to the wheels and the tractor. But there may be places where the deep teeth need not be detached and for such tractors I may employ, for convenience and economy the construction of Fig. 6 which shows the middle cross-bar provided with integral deep teeth 30. In other respects I prefer to make this shoe as heretofore described and as shown in Figs. 1-4.

My invention adapts the shoe to provide the necessary traction on those loose and sandy top-soils where cross-bars on teeth of equal depth would not be sufficient. If it is found desirable in exceptional cases the shoe may be constructed to receive the detachable teeth on the end cross-bars as well as on the middle cross-bar, but so far my experience has indicated the deep teeth on the middle cross-bar will be sufficient. In practice the shoes provide a smooth and even track for the wheel over which the rim of the wheel travels easily without bumping and the deep teeth afford that additional grip in loose or sandy top-soil which will effectually prevent the wheel from slipping backward.

I claim:

1. A substantially rectangular traction shoe for attachment to the rim of a wheel and having a plurality of ground engaging members comprising a tooth at each corner of the shoe, said teeth being of approximately the same depth, and a tooth on each side of the shoe midway between the adjacent end teeth and of greater depth than the end teeth.

2. A traction shoe for attachment to the rim of a wheel and having transverse ground engaging members at its ends and at its middle, the middle member being deeper than the end members and each member having outwardly projecting teeth at its ends.

3. A traction shoe for attachment to the rim of a wheel and having transverse ground engaging members at its ends and a detachable transverse ground engaging member between the end members and comprising a tooth adjacent each side of the shoe.

4. A traction shoe for attachment to the rim of a wheel and having transverse ground engaging members at its ends and a detachable transverse ground engaging member between the end members and of greater depth than the end members and comprising a tooth adjacent each side of the shoe.

5. A traction shoe for attachment to the rim of a wheel and having transverse ground engaging members at its ends and transverse ground engaging members spaced apart and located between the end members and of greater depth than the end members.

6. A traction shoe for attachment to the rim of a wheel and having ground engaging members at its ends and transverse ground engaging members between the end members, said transverse members being spaced apart and detachably engaged with the shoe.

7. A substantially rectangular traction shoe for attachment to the rim of a wheel and having a plurality of ground engaging members comprising a tooth at each corner of the shoe, said teeth being of approximately the same depth, and a tooth detachably engaged with the shoe on each side thereof substantially midway between the adjacent end teeth and of greater depth than the end teeth.

8. A traction shoe for attachment to the rim of a wheel and having end and middle cross-bars of equal depth, a tooth adapted to be engaged with the middle cross-bar to make said cross-bar of greater depth than the end cross-bars, and means for detachably securing said tooth in place.

9. A traction shoe for attachment to the rim of a wheel and having end and middle cross-bars of equal depth, a tooth having a socket to receive the middle cross-bar and adapted to be detachably engaged with said cross-bar to make the same of greater depth than the end cross-bars, and means for detachably securing said tooth in place.

10. A traction shoe for attachment to the rim of a wheel and comprising a plurality of ground engaging teeth, a detachable tooth having a socket to receive one of said ground engaging teeth to increase the depth thereof, and means for securing said detachable tooth to said shoe.

11. A traction shoe for attachment to the rim of a wheel and comprising a plurality of ground engaging teeth, a detachable tooth having a longitudinally extending socket in its upper part to receive one of said ground engaging teeth to increase the depth thereof, and means adjacent said socket and comprising a bolt for securing the detachable tooth to the shoe.

12. The combination of a traction shoe having a ground engaging tooth, of a detachable extension tooth having a socket to receive said ground engaging tooth, and means for detachably securing the detachable tooth to the shoe over said ground engaging tooth.

13. A detachable tooth for a traction shoe having a lower part, a web at one end of said lower part, and a socketed upper part for engagement with the shoe.

14. A detachable tooth for a traction shoe having a lower part, and an upper part comprising parallel side walls to form a socket for engagement with the shoe.

15. A detachable tooth for a traction shoe having a lower part, and an upper part comprising parallel side walls and an end wall to form a socket for engagement with the shoe.

16. A detachable tooth for a traction shoe having a lower part comprising a plane straight wall and a web at one end of said wall, and an upper part comprising a pair of parallel side walls and an end wall forming a socket for engagement with the shoe.

17. A detachable tooth for a traction shoe comprising a lower part, and an upper part adapted for engagement with the shoe, and a stud on said upper part having an opening to receive a bolt for attaching the tooth to the shoe.

18. A traction shoe for attachment to the rim of a wheel and having a ground engaging tooth projecting therefrom, a detachable tooth, and means for securing the detachable tooth to the shoe adjacent to and forming an extension of said ground engaging tooth.

19. A traction shoe for attachment to the rim of a wheel and having ground engaging members at each end and at its middle projecting downward a substantial distance below the body of the shoe, the middle member being deeper than the end members, to penetrate the ground, and said middle member comprising a tooth at each side of the shoe.

20. A traction shoe for attachment to the rim of a wheel and having ground engaging members at each end and at its middle projecting downward a substantial distance below the body of the shoe, the middle member comprising a detachable tooth at each side of the shoe.

21. A traction shoe for attachment to the rim of a wheel and having at each end and at its middle a pair of spaced ground engaging teeth projecting downward a substantial distance below the body of the shoe, extension teeth detachably engaging with said middle teeth to increase the depth thereof, and means for securing said detachable teeth to the shoe.

LOUIS E. SLAUSON.

Witnesses:
H. C. BARR,
O. G. SEKELEY.